United States Patent
Tsukamoto et al.

(10) Patent No.: US 7,071,458 B2
(45) Date of Patent: Jul. 4, 2006

(54) OPTICAL ELEMENT, OPTICAL TRANSMISSION UNIT AND OPTICAL TRANSMISSION SYSTEM

(75) Inventors: Koji Tsukamoto, Kasugai (JP); Masatoshi Ishii, Kawasaki (JP); Masayuki Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/139,803

(22) Filed: May 31, 2005

(65) Prior Publication Data

US 2005/0218305 A1    Oct. 6, 2005

Related U.S. Application Data

(63) Continuation of application No. PCT/JP03/06466, filed on May 23, 2003.

(51) Int. Cl.
*G02B 5/14* (2006.01)

(52) U.S. Cl. .............. 250/216; 25/227.11; 25/227.31
(58) Field of Classification Search ........... 250/216, 250/227.11, 227.28–227.32; 385/16–24, 385/31–36, 39, 42, 47; 359/124–131; 136/246, 136/259
See application file for complete search history.

(56) References Cited

U.S. PATENT DOCUMENTS

| | | | |
|---|---|---|---|
| 4,068,121 A * | 1/1978 | Bringhurst et al. ..... | 250/227.28 |
| 4,085,322 A * | 4/1978 | Sick ....................... | 250/559.45 |
| 4,113,353 A * | 9/1978 | Matsushita ................. | 359/636 |
| 4,114,045 A * | 9/1978 | Shiina ......................... | 250/569 |
| 5,701,374 A * | 12/1997 | Makiuchi ..................... | 385/49 |
| 5,742,720 A * | 4/1998 | Kobayashi et al. .......... | 385/89 |
| 6,081,351 A * | 6/2000 | Tabata ......................... | 358/475 |
| 6,232,592 B1 * | 5/2001 | Sugiyama .............. | 250/227.11 |
| 6,542,306 B1 * | 4/2003 | Goodman ................... | 359/634 |
| 6,576,887 B1 * | 6/2003 | Whitney et al. ....... | 250/227.11 |

FOREIGN PATENT DOCUMENTS

| | | |
|---|---|---|
| JP | 9-15442 | 1/1997 |
| JP | 9-127375 | 5/1997 |
| JP | 9-318853 | 12/1997 |
| JP | 11-119066 | 4/1999 |
| JP | 2001-24213 | 1/2001 |
| JP | 2002-221642 | 8/2002 |
| JP | 2002-329935 | 11/2002 |

\* cited by examiner

*Primary Examiner*—Stephone B. Allen
(74) *Attorney, Agent, or Firm*—Westerman, Hattori, Daniels & Adrian, LLP.

(57) ABSTRACT

An optical element comprising a transparent body 10 including a first end face 12; a second end face 14 forming a prescribed angle to the first end face; and a third end face 15 having a plurality of light reflection parts 16a–16d formed on, which respectively reflect a plurality of light signals entering one of the first end face and the second end face to cause to exit at the other of the first end face and the second end face, a pitch of the plurality of light reflecting parts formed on the third end face, which are projected on the first end face being a first pitch, and a pitch of the plurality of light reflecting parts formed on the third end face, which are projected on the second end face being a second pitch which is different from the first pitch. The light emitting element array, etc. including the light emitting elements, etc. arranged at the first pitch in an array, and the optical waveguide array including the optical waveguides arranged at the second pitch in an array can be easily connected optically with each other.

16 Claims, 11 Drawing Sheets

OPTICAL ELEMENT, OPTICAL TRANSMISSION UNIT AND OPTICAL TRANSMISSION SYSTEM

CROSS REFERENCE TO RELATED APPLICATION

This application is a Continuation of International Application No. PCT/JP03/06466, with an international filing date of May 23, 2003, which designated the United States of America.

TECHNICAL FIELD

The present invention relates to an optical element, and an optical transmission unit and an optical transmission system using the optical element.

BACKGROUND ART

The optical transmission technology makes the high speed communication possible and is much noted.

As a material of the optical fibers for the optical communication, conventionally quartz has been dominantly used. The optical fibers of quartz have very little attenuation of light, and are applicable to the long-distance optical communication.

However, the optical fiber of quartz is relatively expensive. The optical fiber of quartz has a core diameter as small as 10 µm for the single mode and a core diameter as small as 50 µm for the multi mode, which makes the alignment difficult.

Recently, optical fibers of plastics are proposed. The optical fiber of plastics is not so suitable for the long-distance communication but is less expensive in comparison with the optical fiber of quartz. The optical fiber of plastics has a core diameter as large as, e.g., φ120 µm, which facilitates the alignment.

To concurrently transmit a plurality of light signals, an optical fiber array having a plurality of optical fibers arranged in an array is used. Since the outer diameter of the optical fiber of plastic is generally φ500 µm or above, a pitch of the optical fiber array of these optical fibers is 500 µm or above.

However, the standard pitch of the plastic optical fiber (POF) array is 500 µm or above, but the conventional light emitting element array and light receiving element array, i.e., the conventional optical element array is 125 µm or 250 µm. Accordingly, the plastic optical fiber array and the optical element array cannot be optically connected directly with each other.

The standard pitch of the light emitting element array and the light receiving element array is 125 µm or 250 µm so as to ensure the alignment with the conventional optical fiber array of quartz, whose standard pitch is 125 µm or 250 µm.

Here, it is an idea to fabricate a new optical element array of a 500 µm-pitch. When the pitch of the optical element array is 500-µm pitch, the number of the optical element arrays which can be accommodated on one wafer is small, which makes the cost of the optical element array high. The 500 µm-pitch optical element array is not mass-produced, which makes the optical element array expensive. Accordingly, it is preferable to use the 250 µm-pitch optical element array which is universal.

As techniques of optically coupling an optical fiber array and an optical element array having different pitches, the following techniques are proposed.

That is, Patent Reference 1 proposes the technique that an optical waveguide for converting a pitch is disposed between an optical fiber array and an optical element array, whereby the optical fiber array and the optical element array having different pitches are optically connected.

Patent Reference 2 proposes the technique that an imaging lens is disposed between an optical fiber array and an optical element array so as to use an imaging magnification for the pitch conversion.

Patent Reference 3 proposes the technique that a block body with tilted optical fibers buried in is used for the pitch conversion.

[Patent Reference 1]
Specification of Japanese Patent Application Unexamined Publication No. Hei 11-119066

[Patent Reference 2]
Specification of Japanese Patent Application Unexamined Publication No. 2002-221642

[Patent Reference 3]
Specification of Japanese Patent Application Unexamined Publication No. 2001-24213

[Patent Reference 4]
Specification of Japanese Patent Application Unexamined Publication No. Hei 9-127375

[Patent Reference 5]
Specification of Japanese Patent Application Unexamined Publication No. 2002-329935

However, the proposed techniques described above are all cumbersome and cannot meet the requirements of small size and low cost. Especially, in the technique proposed in Patent Reference 2, because of the imaging lens, the alignment is very difficult. In the technique proposed in Patent Reference 3, the steps of forming the block body are complicated, which adds to the cost.

An object of the present invention is to provide an optical element which can optically connect an optical element array, an optical waveguide array, etc. having pitches different from each other, and an optical transmission unit and an optical transmission system using the optical element.

DISCLOSURE OF THE INVENTION

The above-described object is achieved by an optical element comprising a transparent body including a first end face; a second end face forming a prescribed angle to the first end face; and a third end face having a plurality of light reflection parts formed on, which respectively reflect a plurality of light signals entering one of the first end face and the second end face to cause to exit at the other of the first end face and the second end face, a pitch of the plurality of light reflecting parts formed on the third end face, which are projected on the first end face being a first pitch, and a pitch of the plurality of light reflecting parts formed on the third end face, which are projected on the second end face being a second pitch which is different from the first pitch.

The above-described object is attained by an optical transmission unit comprising: a circuit board; a plurality of light emitting elements disposed on the circuit board and arranged at a first pitch, for respectively emitting light signals; and an optical element disposed on the circuit board and comprising a transparent body including a first end face opposed to the plurality of light emitting elements, a second end face forming a prescribed angle to the first end face, and a third end face having a plurality of light reflecting parts which respectively reflect the plurality of light signals entering at the first end face and causing the plurality of light signals to exit at the second end face, a pitch of the plurality of light reflecting parts formed on the third end face, which are projected on the first end face being the first pitch, and a pitch of the plurality of light reflection parts formed on the third end face, which are projected on the second end face being a second pitch which is different from the first pitch.

The above-described object is attained by an optical transmission unit comprising: a circuit board; an optical element disposed on the circuit board and including a transparent body including a first end face, a second end face forming a prescribed angle to the first end face, and a third end face having a plurality of light reflecting parts which respectively reflect a plurality of light signals entering at the second end face to cause the light signals to exit at the first end face, a pitch of the plurality of light reflecting parts formed on the third end face, which are projected on the first end face being a first pitch, and a pitch of the plurality of light reflecting parts formed on the third end face, which are projected on the second end face being a second pitch which is different form the first pitch; and light receiving elements arranged at the first pitch, opposed to the first end face of the optical element, which respectively receive the plurality of light signals.

The above-described object is attained by an optical transmission system comprising: a plurality of light emitting elements arranged at a first pitch, for respectively emitting light signals; a first optical element including a transparent body having a first end face opposed to the plurality of light emitting elements, a second end face forming a prescribed angle to the first end face, and a third end face having a plurality of light reflecting parts which respectively reflect the plurality of light signals entering at the first end face to cause the plurality of light signals to exit at the second end face, a pitch of the plurality of light reflecting parts formed on the third end face, which are projected on the first end face being the first pitch, a pitch of the plurality of light reflecting parts formed on the third end face, which are projected on the second end face being a second pitch which is different from the first pitch; a plurality of optical waveguides arranged at the second pitch and having one ends opposed to the second end face of the first optical element; and a second optical element including a fourth end face opposed to the other ends of the plurality of optical waveguides, a fifth end face forming a prescribed angle to the fourth end face, and a sixth end face having a plurality of light reflecting parts formed on, which respectively reflect a plurality of light signals entering at the fourth end face to cause the plurality of light signals to exit at the fifth end face, a pitch of the plurality of light reflecting parts formed on the sixth end face, which are projected on the fifth end face being the first pitch, and a pitch of the plurality of light reflecting parts formed on the sixth end face, which are projected on the fourth end face being the second pitch; and a plurality of light receiving elements arranged at the first pitch, opposed to the fifth end face of the second optical element, for respectively receiving the plurality of light signals.

According to the present embodiment, a plurality of light signals emitted by the light emitting elements arranged at the first pitch can enter the optical waveguides arranged at the second pitch. A plurality of light signals exiting the optical waveguides arranged at the second pitch can also enter the light receiving elements arranged at the first pitch. Thus, according to the present invention, the light emitting element array, etc. including the light emitting elements, etc. arranged at the first pitch, and the optical waveguide array including the optical waveguides arranged at the second pitch in an array can be easily connected optically with each other. Furthermore, the first end face and the second end face are flat, which allows the light emitting array, the optical waveguide array, etc. for the universal use to be used. The use of the light emitting element array, the optical waveguide array, etc. for the universal use can contribute to reducing the cost.

BEST MODES FOR THE CARRYING OUT THE INVENTION

The optical element, and the optical transmission unit and the optical transmission system according to one embodiment of the present invention will be explained with reference to FIGS. 1 to 11.

(The Optical Element)

Figure 1:
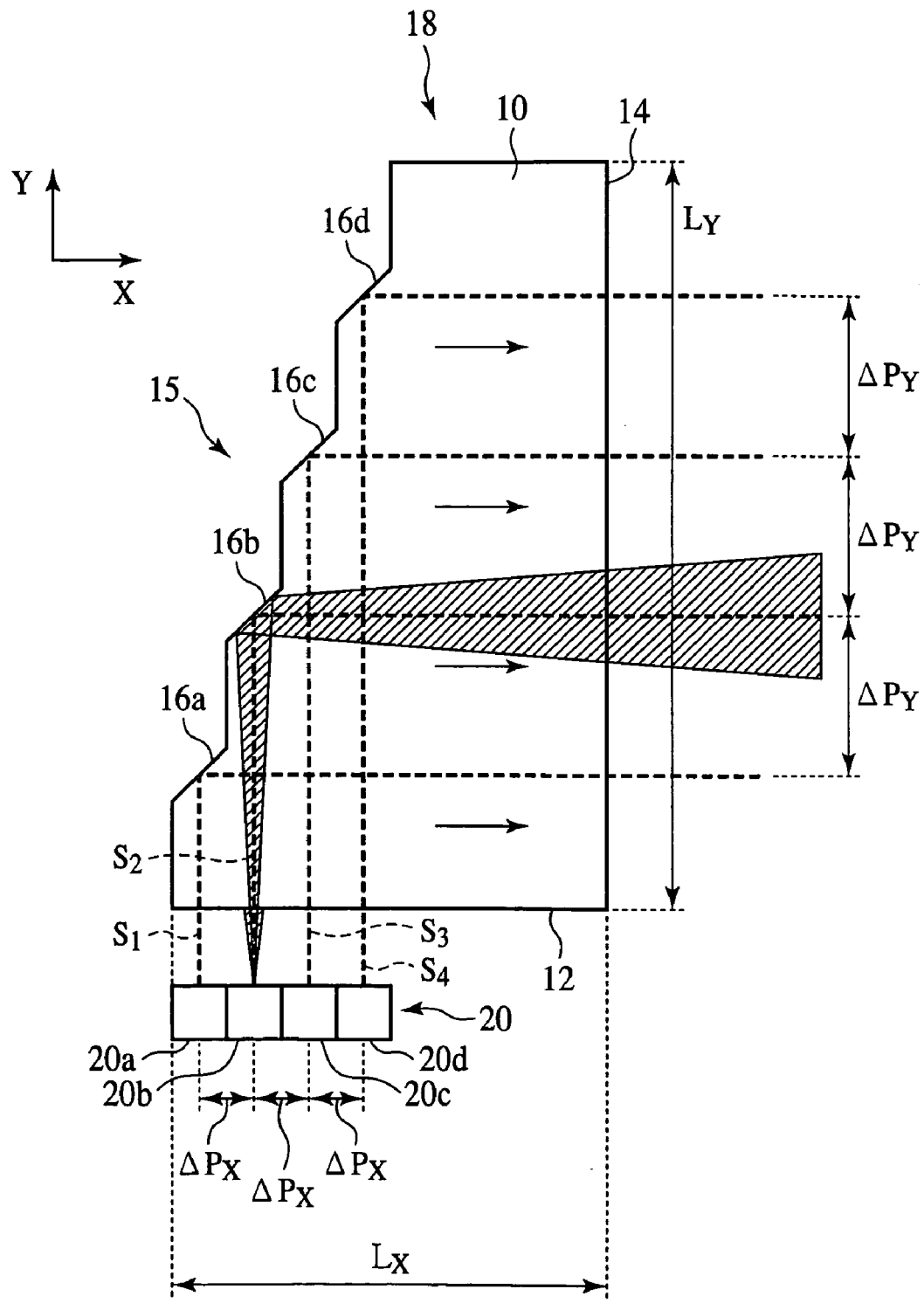
FIG. 1 is a plan view illustrating the optical element according to one embodiment of the present invention.
Figure 2A:
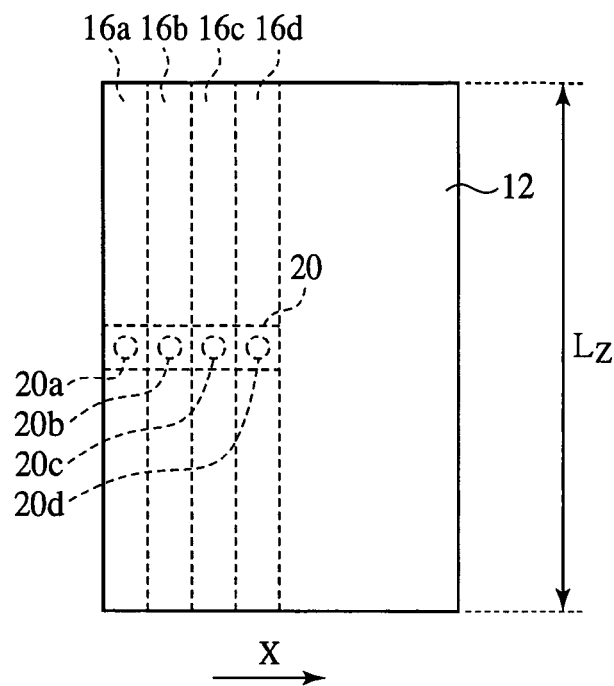
FIGS. 2A and 2B are side views illustrating the optical element according to the embodiment of the present invention.
Figure 2B:
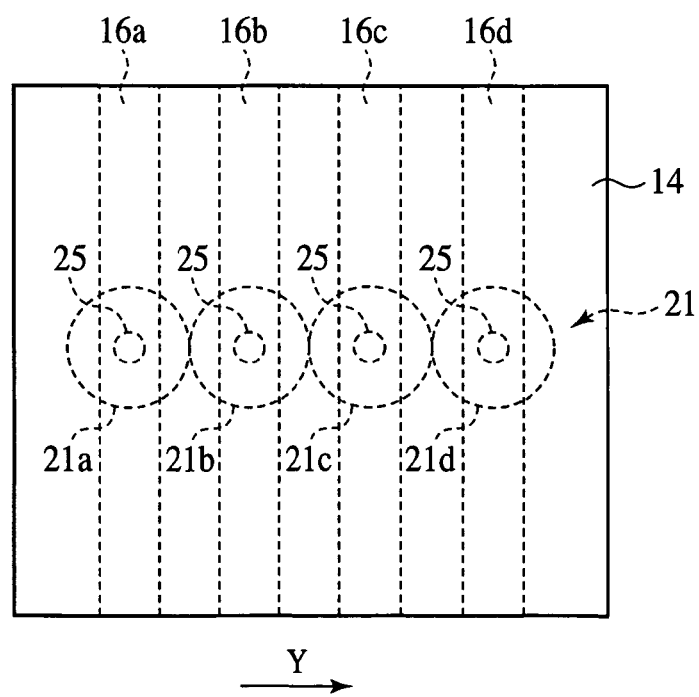

First, the optical element according to the present embodiment will be explained. FIG. 1 is a plan view of the optical element according to the present embodiment. FIGS. 2A and 2B are side views of the optical element according to the present embodiment. FIG. 2A is a view as viewed from the lower side of the drawing of FIG. 1. FIG. 2B is a view as viewed from the right side of the drawing of FIG. 1.

The optical element according to the present embodiment is formed of a transparent body 10. The material of the transparent body 10 can be plastics, glass, quartz or others. The plastics can be polycarbonate, acryl or others. In consideration the easiness of molding the transparent body 10, the transparent body 10 is formed suitably of plastics. When the material of the transparent body 10 is plastics, the transparent body 10 can be formed by, injection molding using a mold.

The shape of the transparent body 10 is a partially cut-off rectangular parallelopiped of $L_X \times L_Y \times L_Z$ size. The width $L_X$ of a first end face 12 is, e.g., 2 mm. The width $L_Y$ of a second end face 14 is, e.g., 3 mm. The height $L_Z$ of the transparent body 10 is, e.g., 2 mm. The intersection angle between the first end face 12 of the transparent body 10 and the second end face 14 of the transparent body 10 is 90 degree.

A light emitting element array 20 including light emitting elements 20a–20d laid out at, e.g., a first pitch $\Delta P_X$ in a one-dimensional array is opposed to the first end face 12 of the transparent body 10. The light emitting element array 20 can be, e.g., VSCEL (Vertical Cavity Surface-Emitting Laser). The VCSEL array comprises VCSELs arranged in an array. The first pitch $\Delta P_X$ is, e.g., 250 µm.

An optical waveguide array 21 including optical waveguides 21a–21d laid out at, e.g., a second pitch $\Delta P_Y$ in a one-dimensional array is opposed to the second end face 14 of the transparent body 10. The optical waveguide array 21 can be, e.g., a plastic fiber array. The plastic fiber array comprises optical fibers of plastics arranged in an array. The second pitch $\Delta P_Y$ is, e.g., 500 µm.

A plurality of light reflecting parts 16a–16d are formed on the third end face 15 of the transparent body 10. The pitch of the plurality of light reflecting parts 16a–16d formed on the third end face 15 projected on the first end face 12 is the first pitch $\Delta P_X$. On the other hand, the pitch of the plurality of light reflecting parts 16a–16d formed on the third end face 15 projected on the second end face 14 is the second pitch $\Delta P_Y$. The tilt of the light reflecting parts 16a–16d to the first end face 12 is respectively 45 degrees. The tilt of the light reflecting parts 16a–16d to the second end face 14 is respectively 45 degrees. The light reflecting parts 16a–16d respectively reflect a plurality of light signals $S_1$–$S_4$ incident on the first end face 12 to cause the light signals $S_1$–$S_4$ at the second end face 14.

The optical element 18 according to the present embodiment is thus constituted.

Next, the operation of the optical element according to the present embodiment will be explained with reference to FIGS. 1 to 2B.

As illustrated in FIG. 1, the light signals $S_1$–$S_4$ are emitted respectively from the optical elements 20a–20d arranged in the one-dimensional array. The plurality of light signals $S_1$–$S_4$ emitted from the light emitting elements 20a–20d enter the transparent body 10 at the first end face 12.

The plurality of light signals $S_1$–$S_4$ which have entered the transparent body 10 are reflected respectively on the light reflecting parts 16a–16d. The light signals $S_1$–$S_4$ reflected respectively on the light reflecting parts 16a–16d exit the transparent body 10 outside at the second end face 14.

The light signals $S_1$–$S_4$ which have exit at the second end face 14 enter the optical waveguides 21a–21d arranged in the one-dimensional array.

As described above, in the present embodiment, because the pitch of the light reflecting parts 16a–16d formed on the third end face 15 projected on the first end face 12 is the first pitch $\Delta P_X$, and the pitch of the light reflecting parts 16a–16d formed on the third end face 15 projected on the second end face 14 is the second pitch $\Delta P_Y$, the light signals $S_1$–$S_4$ exiting the light emitting elements 20a–20d arranged at the first pitch $\Delta P_X$ enter the optical waveguides 21a–21d arranged at the second pitch $\Delta P_Y$.

The plurality of light signals $S_1$–$S_4$ enter at the first end face 12 and exits at the second end face 14 here. However, it is possible that the plurality of light signals $S_1$–$S_4$ enter at the second end face 14 and exit at the first end face 12. In this case, the light signals $S_1$–$S_4$ exiting the optical waveguides 21a–21d arranged at the second pitch $\Delta P_Y$ can enter the light receiving elements 23a–23d arranged at the first pitch $\Delta P_X$ (see FIG. 6).

As described above, according to the present embodiment, the plurality of light signals $S_1$–$S_4$ exiting the light emitting elements 20a–20d arranged at the first pitch $\Delta P_X$ can enter the optical waveguides 21a–21d arranged at the second pitch $\Delta P_Y$. Also, the plurality of light signals $S_1$–$S_4$ exiting the optical waveguides 21a–21d arranged at the second pitch $\Delta P_Y$ can enter the light receiving elements 23a–23d arranged at the first pitch $\Delta P_X$. Thus, according to the present embodiment, the light emitting element array 20, etc. including the light emitting elements 20a–20d etc. arranged at the first pitch $\Delta P_X$ in an array and the optical waveguide array 21 including the optical waveguides 21a–21d arranged at the second pitch $\Delta P_Y$ in an array can be simply optically connected with each other. Furthermore, the first end face 12 and the second end face 14 are plat, which permits the universal light emitting element array 20, optical waveguides array 21, etc. to be used. The universal light emitting element array 20, optical waveguide array 21, etc. can be used, which contributes to the cost reduction.

(Modification 1)

Figure 3:
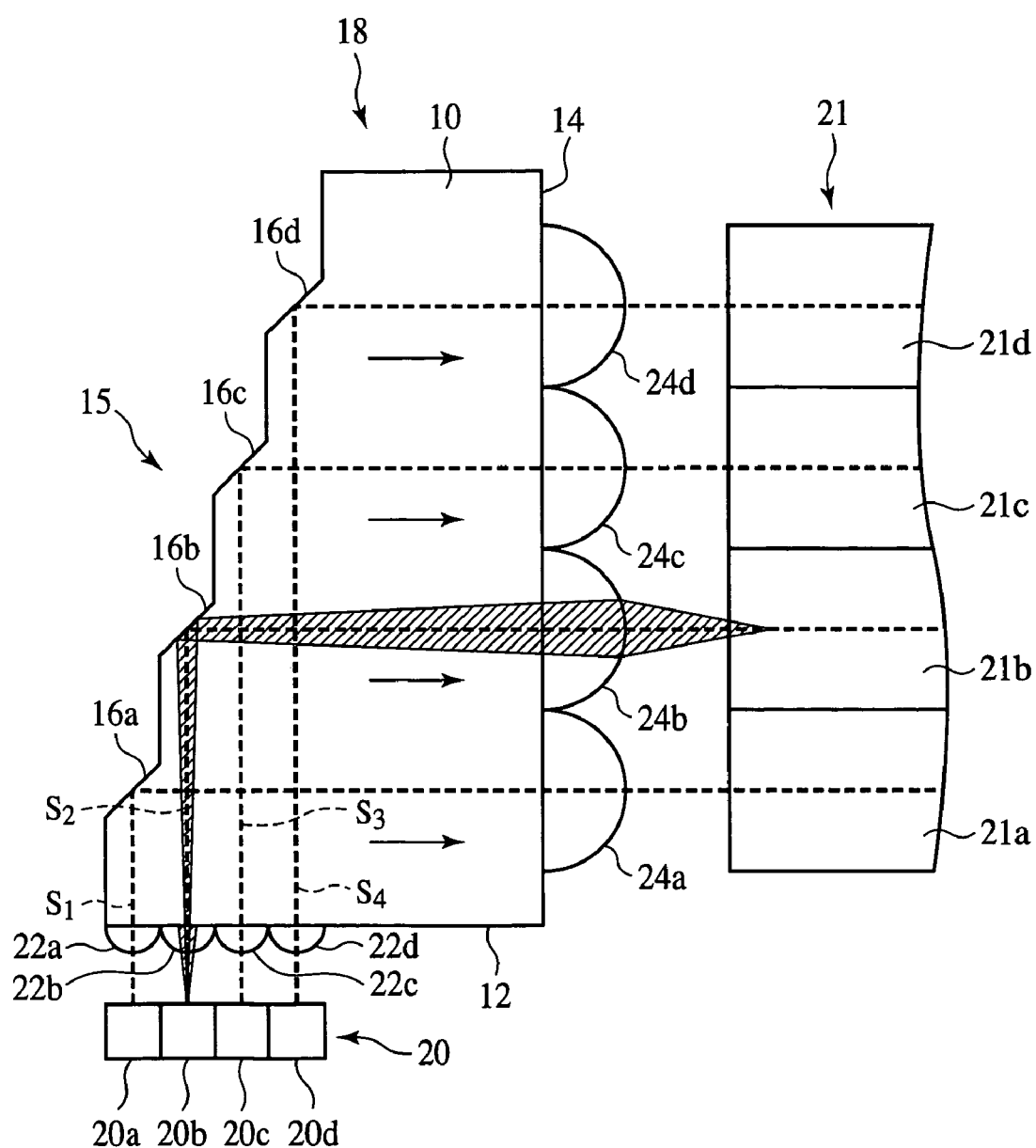
FIG. 3 is a plan view illustrating the optical element according to Modification 1 of the embodiment of the present invention.
Figure 4A:
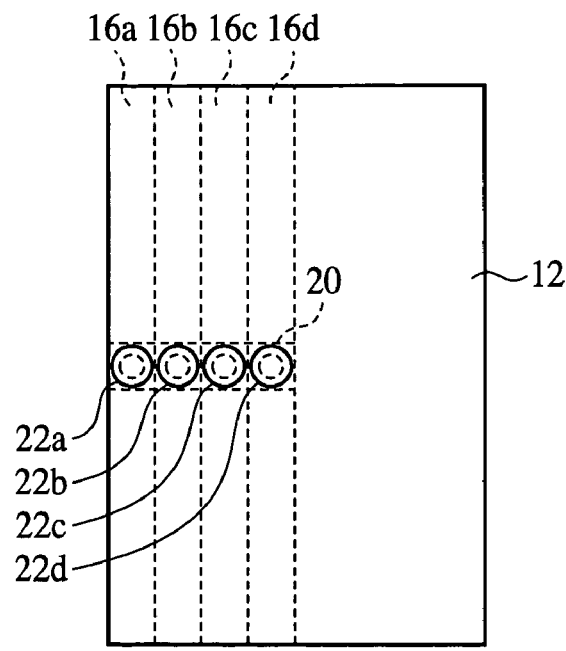
FIGS. 4A and 4B are side views illustrating the optical element according to Modification 1 of the embodiment of the present invention.
Figure 4B:
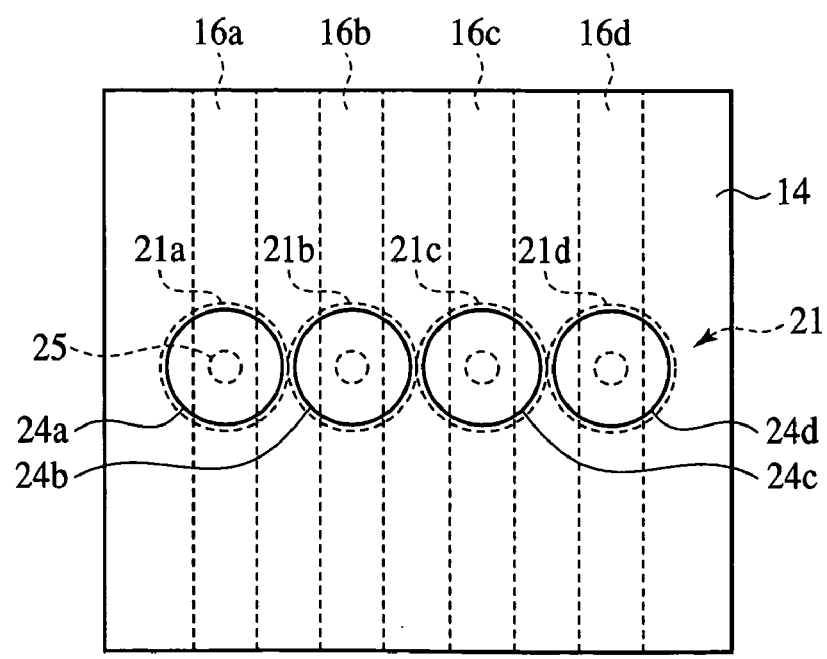

Next, the optical element according to Modification 1 of the present embodiment will bee explained with reference to FIGS. 3 to 4B. FIG. 3 is a plan view illustrating the optical element according to the present modification. FIGS. 4A and 4B are side views of the optical element according to the present modification. FIG. 4A is a view as viewed at the lower side of the drawing of FIG. 3. FIG. 4B is a view as viewed from the right side of the drawing of FIG. 3.

The optical element according to the present modification is characterized mainly in that a plurality of lenses 22a–22d and a plurality of lenses 24a–24d are provided respectively on the first end face 12 and on the second end face 14.

As illustrated in FIGS. 3 to 4B, the plurality of lenses 22a–22d are formed on the first end face 12 of the transparent body 10. The shape of the lenses 22a–22d is a hemisphere. The lenses 22a–22d are formed integral with the transparent body 10. The lenses 22a–22d are formed at the first pitch $\Delta P_X$. The lenses 22a–22d are formed so as to collimate light signals $S_1$–$S_4$ entering from the outside.

Also on the second end face 14 of the transparent body 10, the plurality of lenses 24a–24d are formed. The shape of the lenses 24a–24d is a hemisphere. The lenses 24a–24d are formed integral with the transparent body 10. The lenses 24a–24d are formed at the second pitch $\Delta P_Y$. The lenses 24a–24d are formed so that the beam diameter of the light signals $S_1$–$S_4$ exiting the transparent body 10 outside is becomes a required beam diameter.

According to the present modification, the lenses 22a–22d are formed on the first end face 12, whereby the light signals $S_1$–$S_4$ can be collimated, and the light signals $S_1$–$S_4$ are prevented from spreading in the transparent body 10. Thus, according to the present modification, the attenuation of the light signals $S_1$–$S_4$ can be prevented.

According to the present modification, the lenses 24a–24d are formed on the second end face 14, whereby the beam diameter of the light signals $S_1$–$S_4$ exiting outside can be set at a required beam diameter. Thus, according to the modification, the beam diameter of the light signals $S_1$–$S_4$ can be matched with the diameter of the core 25 of the optical waveguide 21.

The plurality of light signals $S_1$–$S_4$ enter at the first end face 12 and exit at the second end face 14 here. However, it is possible that the plurality of light signals $S_1$–$S_4$ enter at the second end face 14 and exit at the first end face 12. In this case, the following effect can be obtained.

That is, the light signals $S_1$–$S_4$ are collimated by the lenses 24a–24d formed on the second end face 14 of the transparent body 10, whereby the light signals $S_1$–$S_4$ are prevented from spreading in the transparent body 10. Thus, the attenuation of the light signals $S_1$–$S_4$ can be prevented.

The lenses 22a–22d formed on the end face 12 of the transparent body 10 can set the beam diameter of the light signals $S_1$–$S_4$ exiting outside at a required beam diameter. Accordingly, the beam diameter of the light signals $S_1$–$S_4$ exiting outside can be matched with the size of the light receiving regions (not illustrated) of the light receiving elements 23a–23d (see FIG. 6).

(Modification 2)

Figure 5A:
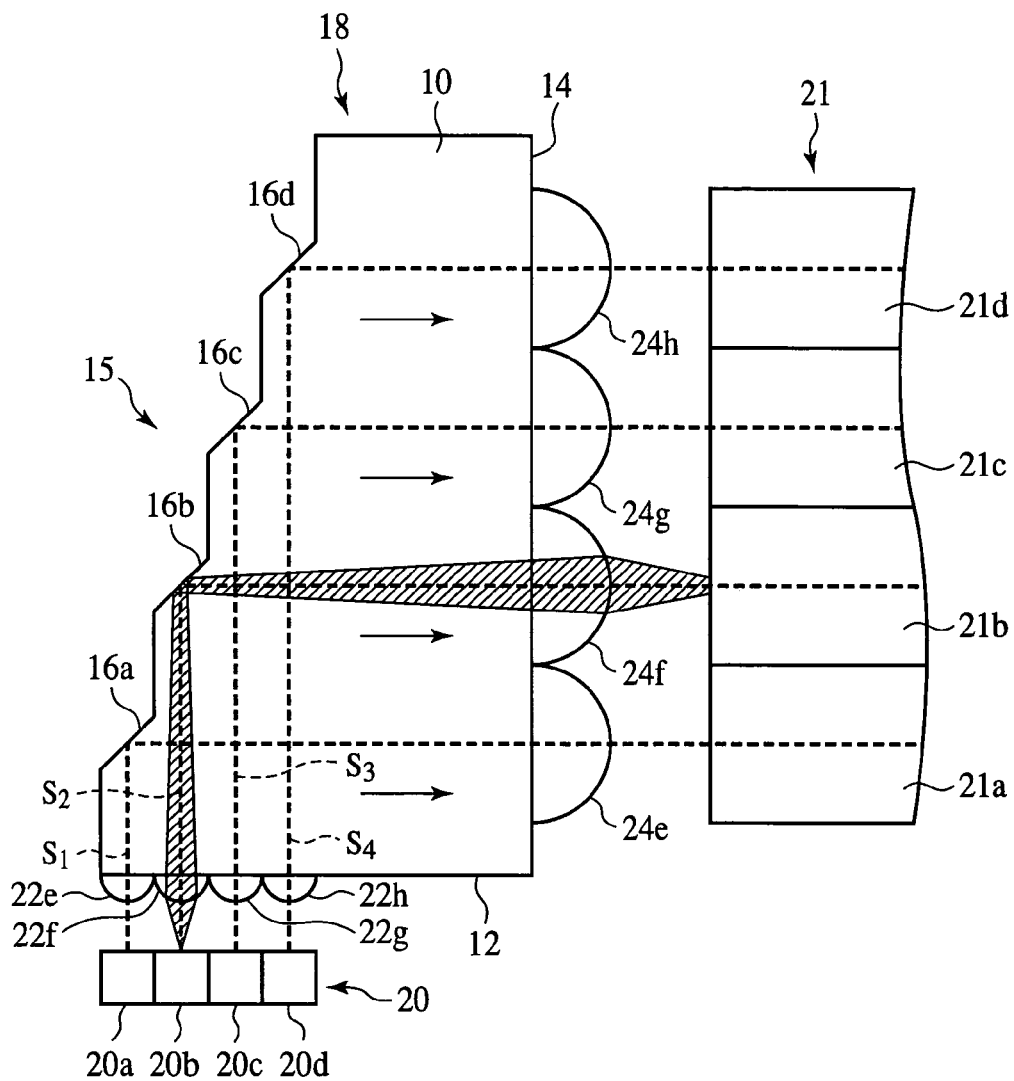
FIGS. 5A and 5B are plan views (Part 1) illustrating the optical element according Modification 2 of the embodiment of the present invention.
Figure 5B:
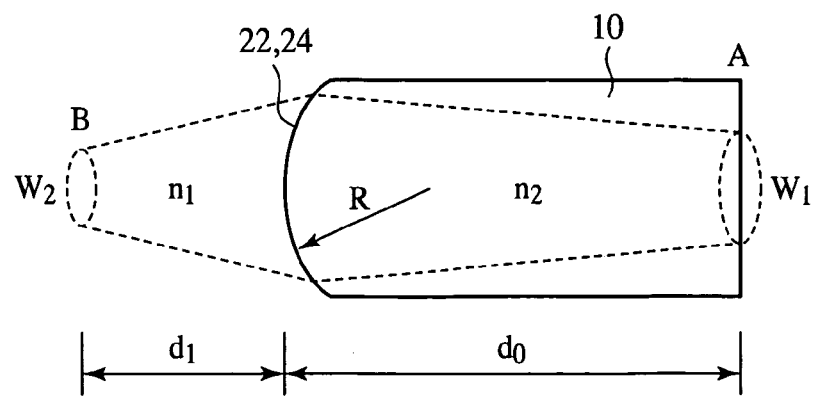
Figure 6:
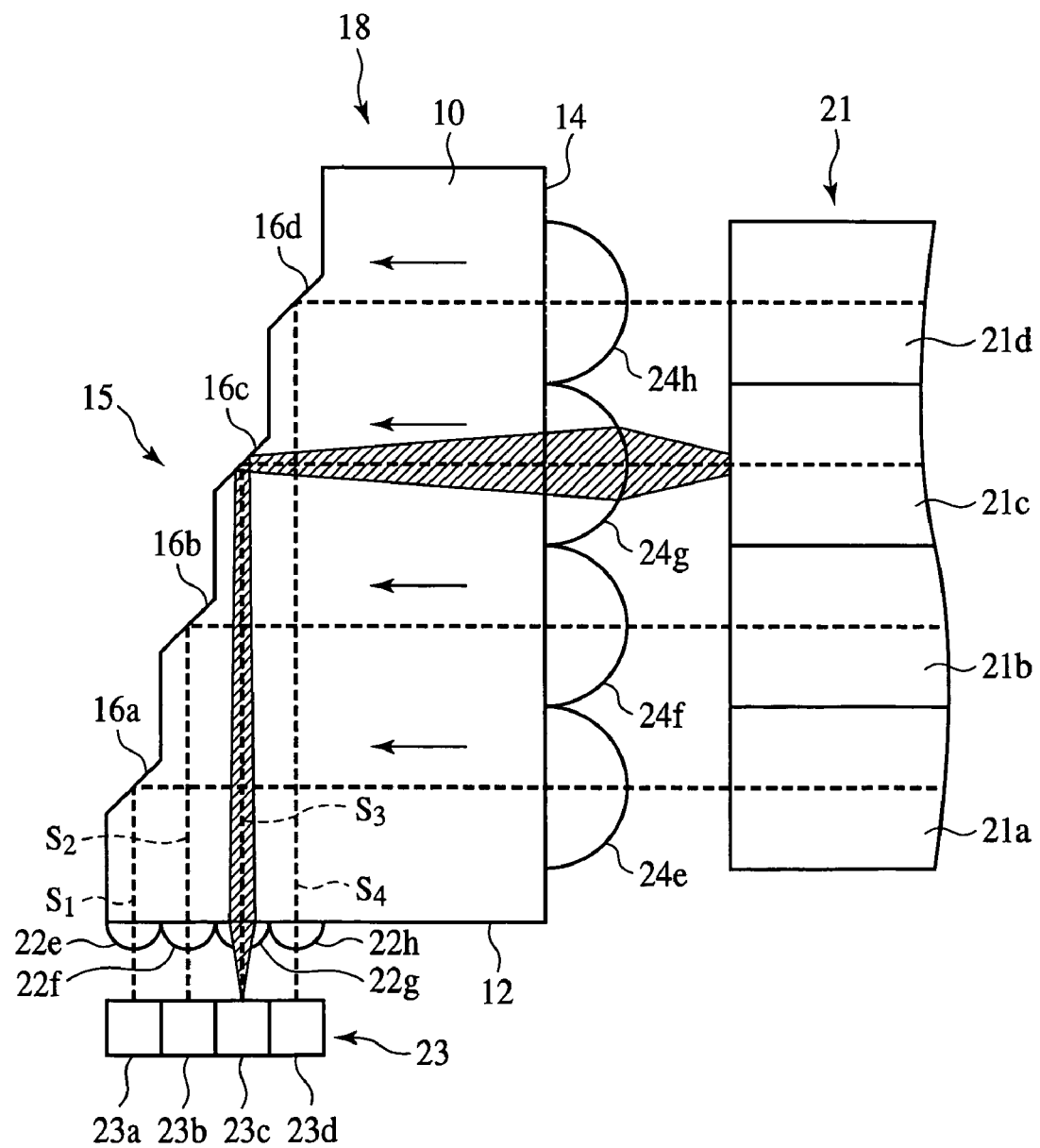
FIG. 6 is a plan view (Part 2) illustrating the optical element according to Modification 2 of the embodiment of the present invention.

Next, the optical element according to the present embodiment will be explained with reference to FIGS. 5A to 6. FIGS. 5A and 5B are a plan view (Part 1) illustrating the optical element according to the present modification. In FIGS. 5A and 5B, the light signals $S_1$–$S_4$ enter at the first end face 12 and exit at the second end face 14. FIG. 6 is a plan view (Part 2) illustrating the optical element according to the present modification. In FIG. 6, the light signals $S_1$–$S_4$ enter at the second end face 14 and exit at the first end face 12.

The optical element according to the present modification is characterized mainly in that the lenses 22e–22h and lenses 24e–24h are formed so that the light reflecting parts 16a–16d are the beam waists of the light signals $S_1$–$S_4$.

As illustrated in FIG. 5A, the plurality of lenses 22e–22h are formed on the first end face 12 of the transparent body 10. The lenses 22e–22h are formed integral with the transparent body 10. The lenses 22e–22h are formed so that the beam waists of the light signals $S_1$–$S_4$ are positioned at the light reflecting parts 16a–16d. The beam waist is a position where the size of the spot of the Gaussian beam of the basic mode is minimum.

FIG. 5B is a conceptual view illustrating the specific method for designing so that the positions of the reflecting parts are the positions of the beam waists.

In FIG. 5B, $w_1$ indicates a beam diameter at Point A when Point A becomes a beam waist, and $w_2$ indicates a beam diameter at Point B. R indicates a curvature radius of the lens, $n_1$ indicates a refractive index of air, and $n_2$ indicates a refractive index of the transparent body 10. $d_1$ indicates a distance from the forward end of the lens to Point B, and $d_2$ indicates a distance from the forward end of the lens to Point A.

The ray-tracing method gives the following formula (see Kenji Kohno, "Fundamentals and Application of Optics for Optical elements", Gendai-Kogaku-Sha(in Japanese)).

$$\left(1 + \frac{n_1 - n_2}{n_1}\frac{d_1}{R}\right)\left(\frac{n_1 - n_2}{n_1}\frac{1}{R}\right) + \left(\frac{\lambda}{\pi w_1^2}\right)^2\left[\frac{n_1}{n_2}d_0 + \left(1 + \frac{n_1 - n_2}{n_2}\frac{d_0}{R}\right)d_1\right]\left(1 + \frac{n_1 - n_2}{n_2}\frac{d_0}{R}\right) = 0 \quad (1)$$

In Formula 1, the position of Point A is at the position of the light reflecting parts 16a–16d, the position of Point B is the position of the light emitting surface of the light emitting elements 20a–20d, and R is the curvature radius of the lenses 22e–22h, the positions of the light reflecting parts 16a–16d can be the position of the beam waists.

As illustrated in FIG. 6, the plurality of lenses 24e–24h are formed on the second end face 14 of the transparent body 10. The lenses 24e–24h are formed integral with the transparent body 10. The lenses 24e–24h are formed so that the beam waists of the light signals $S_1$–$S_4$ are positioned at the light reflecting parts 16a–16d.

In Formula 1, the position of Point A is at the position of the light reflecting parts 16a–16d, the position of Point B is the position of the end face of the optical waveguides 21a–21d, and R is the curvature radius of the lenses 24e–24h, the positions of the light reflecting parts 16a–16d can be the position of the beam waists.

The light receiving element 23 including the light receiving elements 23a–23d arranged at the first pitch $\Delta P_X$ in a one-dimensional array is opposed to the second end face 14 of the transparent body 10. The light receiving array 23 can be, e.g., a PD (Photo Detector) array. The PD array comprises PDs arranged in an array.

According to the present modification, the lenses 22e–22h and lenses 24e–24h are formed so that the positions of the light reflecting parts 16a–16d are the beam waists of the light signals $S_1$–$S_4$, whereby the cross talk of the light signals $S_1$–$S_4$ can be prevented.

The lenses 22e–22h and lenses 24e–24h are formed so that the positions of the light reflecting parts 16a–16d are the beam waists of the light signals $S_1$–$S_4$ here, but the positions of the light reflecting parts 16a–16d may not be essentially the positions of the beam waists. Positions near the light reflecting parts 16a–16d are beam waists of the light signals $S_1$–$S_4$, whereby the cross talk of the light signals $S_1$–$S_4$ can be prevented.

(Modification 3)

Figure 7:
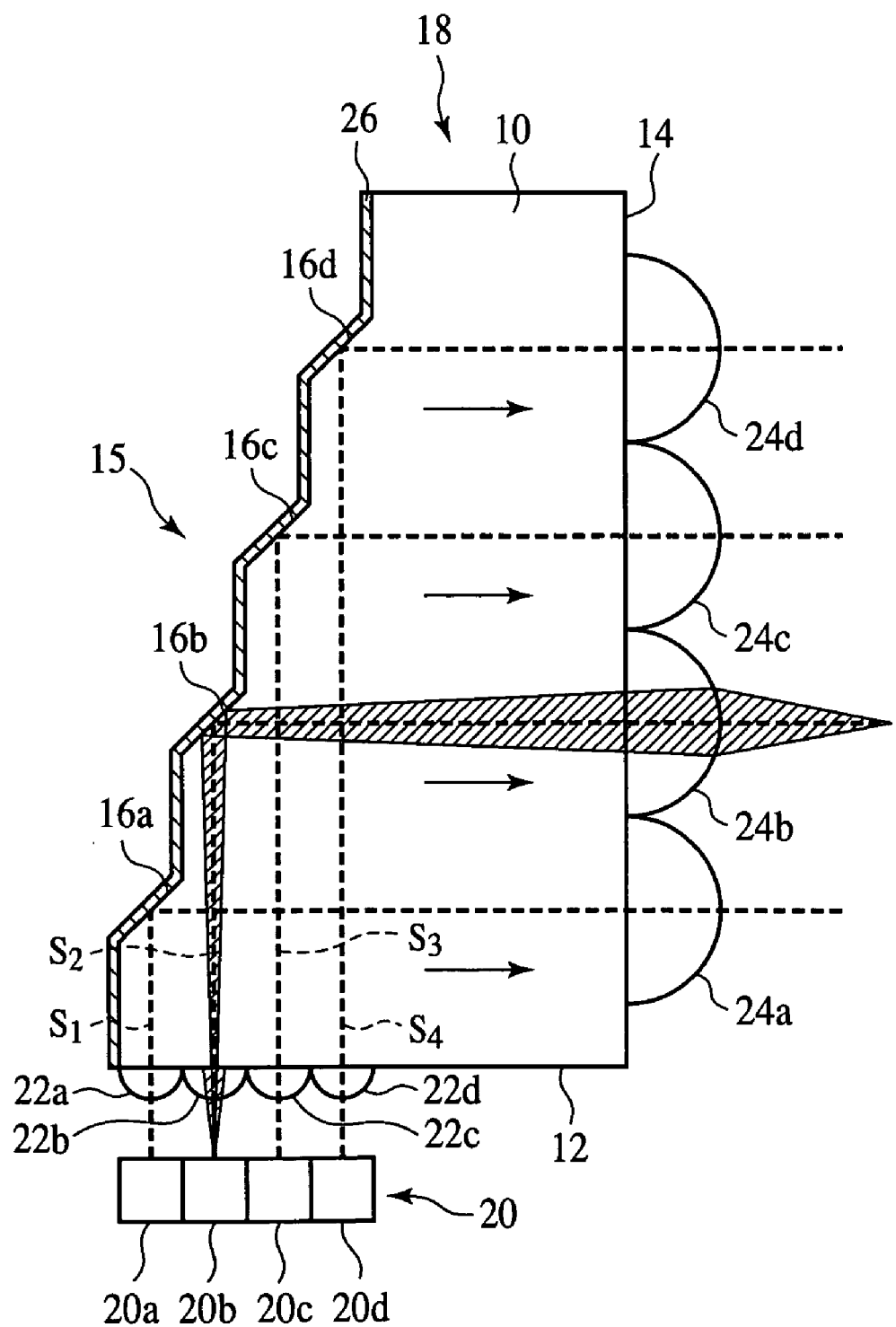
FIG. 7 is a plan view illustrating the optical element according to Modification 3 of the embodiment of the present invention.

Next, the optical element according to Modification 3 of the present embodiment will be explained with reference to FIG. 7. FIG. 7 is a plan view illustrating the optical element according to the present modification.

The optical element according to the present modification is characterized mainly in that a reflection film 26 is formed, covering the light reflecting parts 16a–16d.

As illustrated in FIG. 7, the reflection film 26 is formed on the third end face 15 of the transparent body 10, covering the light reflection parts 26a–26d. The reflection film 26 can be, e.g., Al film, Cr film or others. The reflection film 26 can be formed by, e.g., vapor deposition.

According to the present modification, the reflection film 26 is formed, covering the light reflecting parts 16a–16d, whereby the light signals $S_1$–$S_4$ can be reflected without failure even when the light reflection parts 16a–16d fail to satisfy conditions for the total reflection.

(Modification 4)

Figure 8:
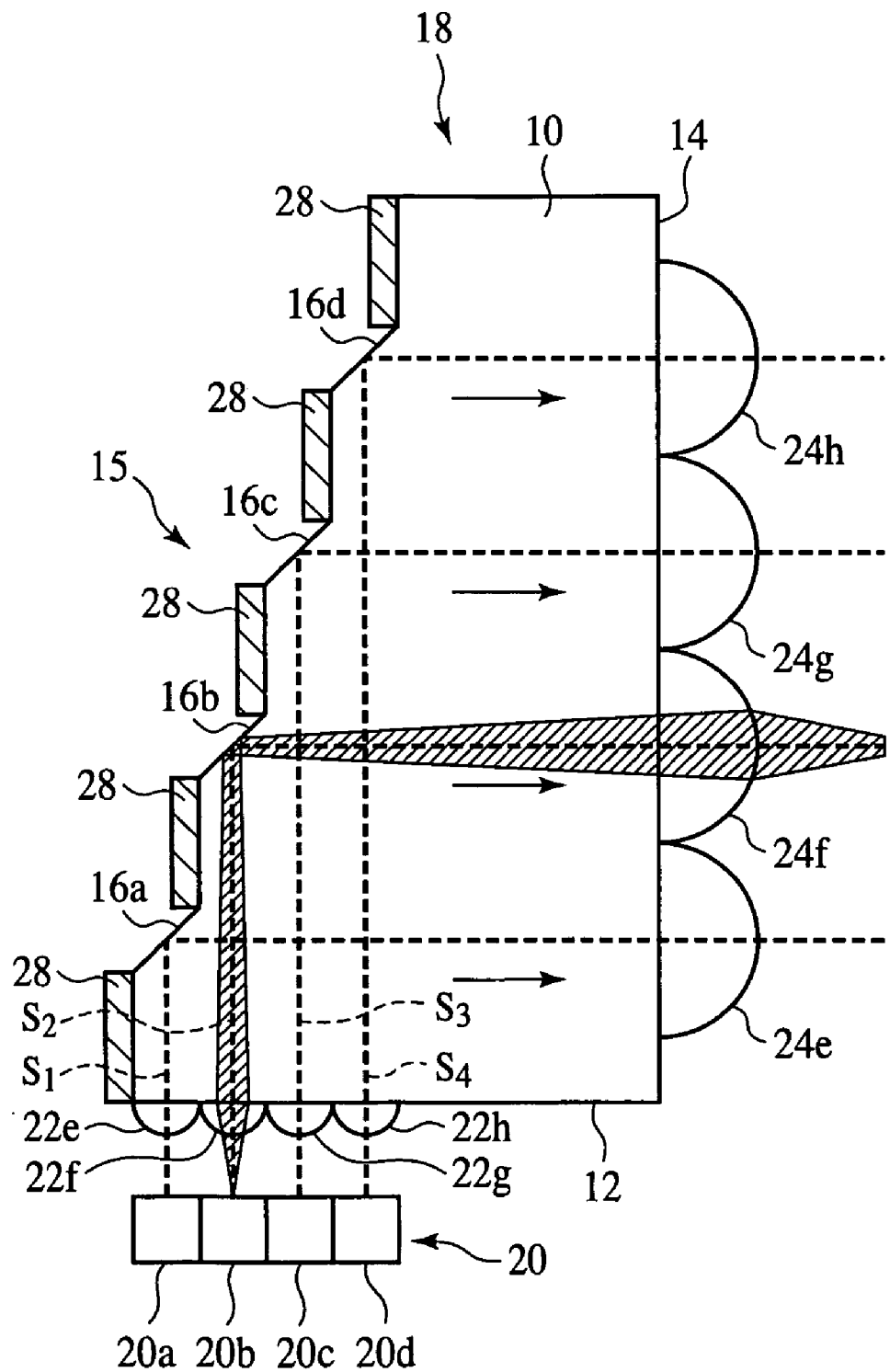
FIG. 8 is a plan view (Part 1) illustrating the optical element according to Modification 4 of the embodiment of the present invention.
Figure 9:
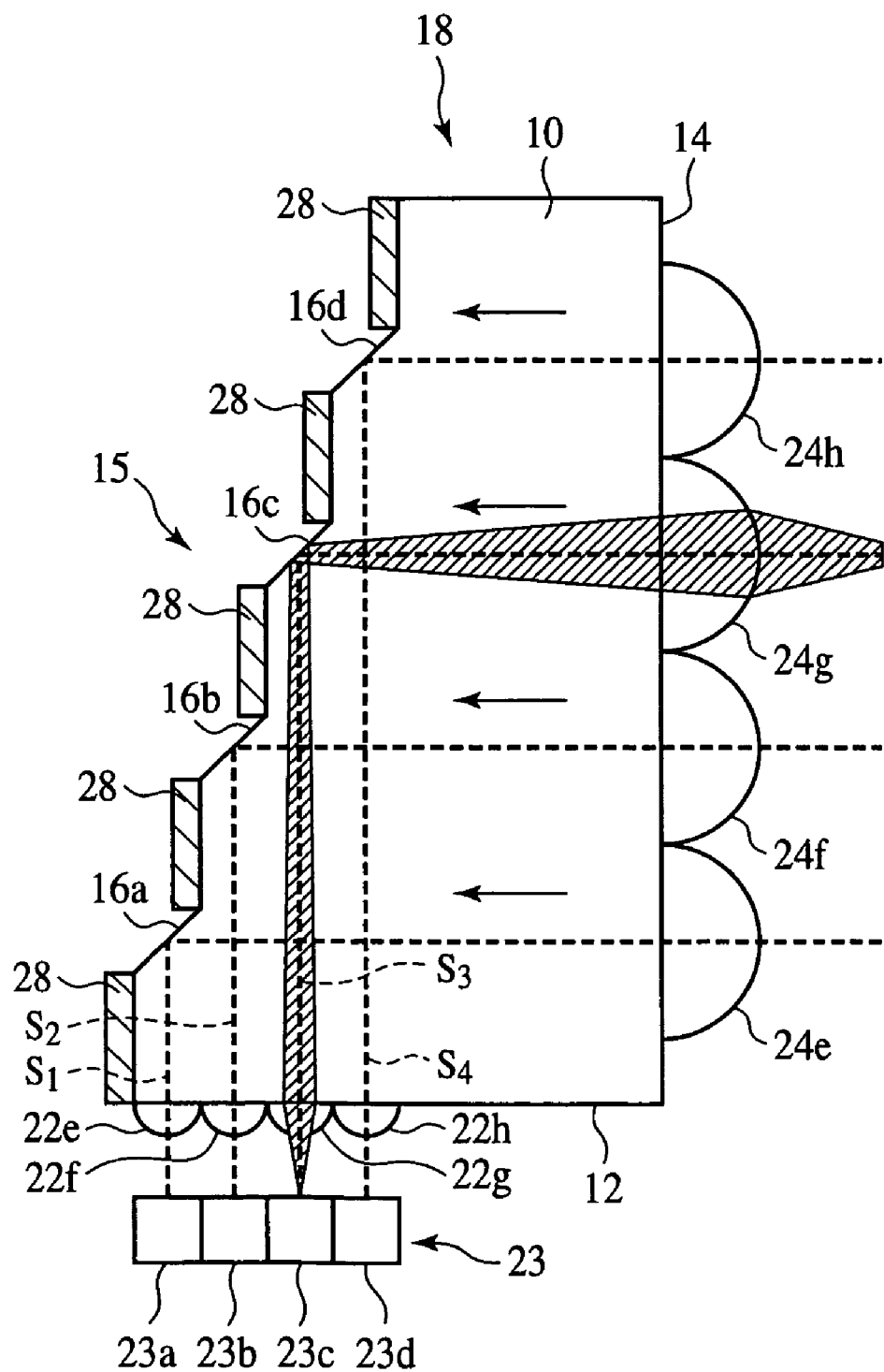
FIG. 9 is a plan view (Part 2) of the optical element according to Modification 4 of the embodiment of the present invention.

Next, the optical element according to Modification 4 of the present embodiment will be explained with reference 8. FIG. 8 is a plan view (Part 1) illustrating the optical element according to the present modification. In FIG. 8, the light signals $S_1$–$S_4$ enter at the first end face 12 and exit at the second end face 14. FIG. 9 is a plan view (Part 2) illustrating the optical element according to the present modification. In FIG. 9, the light signals $S_1$–$S_4$ enters the second end face 14 and exit at the first end face 12.

The optical element according to the present modification is characterized mainly in that light absorbers 28 are formed on the faces except the light reflecting parts 16a–16d, the first end face 12 and the second end face 14.

As illustrated in FIGS. 8 and 9, the light absorbers 28 are formed on the faces except the light reflection parts 16a–16d, the first end face 12 and the second end face 14. The material of the light absorbers 28 can be, e.g., carbon black.

According to the present modification, because of the light absorbers 28, the light absorbers 28 can absorb light which is astray from the prescribed optical paths. Thus, according to the present embodiment, the cross talk of the light signals $S_1$–$S_4$ can be prevented.

(The Optical Transmission Unit)

Figure 10A:
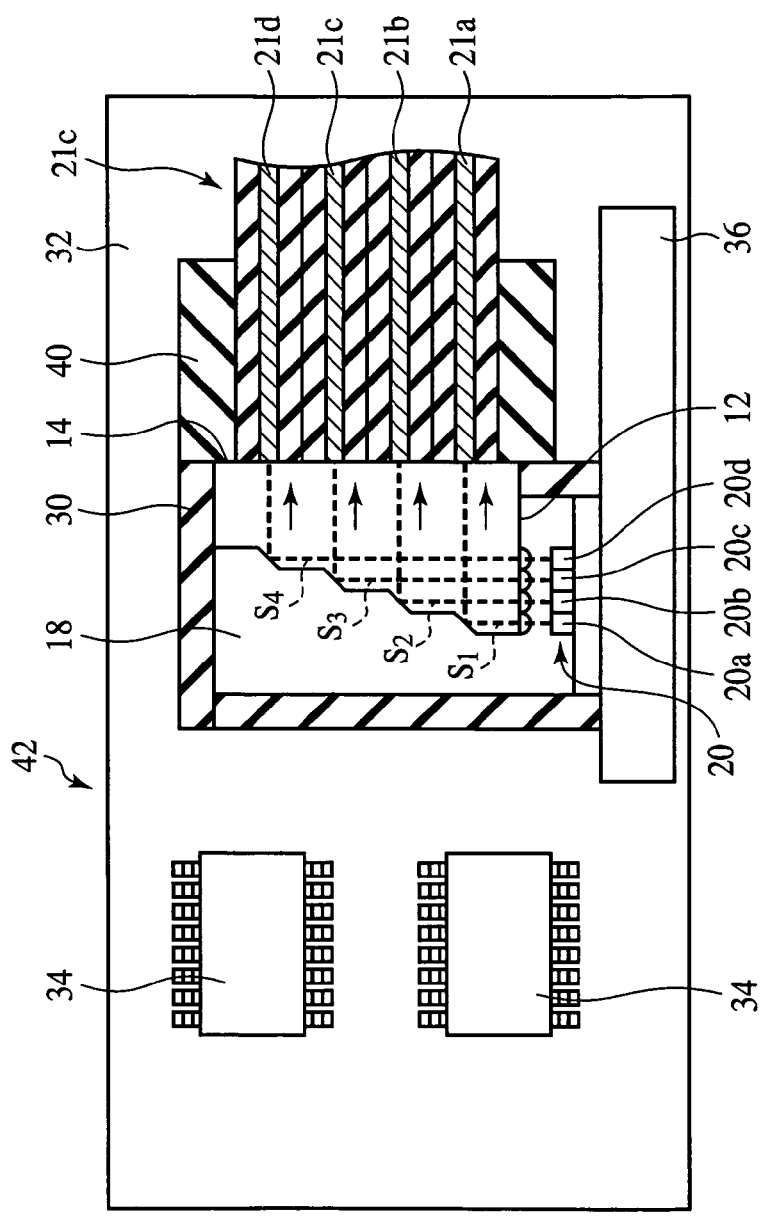
FIGS. 10A and 10B are a plan view and a side view illustrating the optical transmission unit according to the embodiment of the present invention.
Figure 10B:
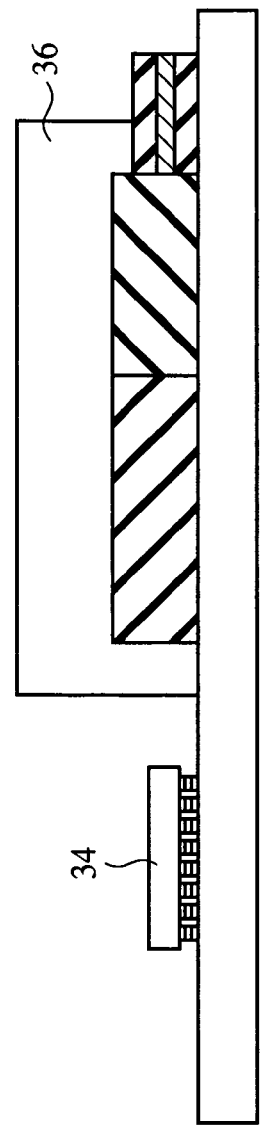

Next, the optical transmission unit according to the present embodiment will be explained with reference to FIGS. 10A and 10B. FIGS. 10A and 10B are a plan view and a side view illustrating the optical transmission unit according to the present embodiment. FIG. 10A is the plan view, and the FIG. 10B is the side view.

As illustrated in FIGS. 10A and 10B, the optical element 18 is placed in a housing 30. The optical element 18 is secured to a circuit board 32 by the housing 30. Semiconductor elements 34 forming a driver circuit are mounted on the circuit board 32.

Another circuit board 36 is disposed on the side of the first end face 12 of the optical element 18. The circuit board 36 is mounted perpendicular to the circuit board 32. A light emitting element array 20 is mounted on the circuit board 36. The light emitting element array 20 is opposed to the first end face 12 of the optical element 18. The light emitting element array 20 comprises light emitting elements 20a–20d arranged at the first pitch $\Delta P_X$ in a one dimensional array, as in the above.

An optical waveguide array 21 is opposed to the second end face 14 of the optical element 18. As in the above, the optical waveguide array 21 comprises optical waveguides 21a–21d arranged at the second pitch $\Delta P_Y$ in a one dimensional array. The ends of optical waveguide array 21 is housed in a connector 40. The optical waveguide array 21 is secured to the housing 30 by the connector 40.

Thus, the optical transmission unit 42 according to the present embodiment is constituted.

Next, the operation of the optical transmission unit according to the present embodiment will be explained with reference to FIGS. 10A and 10B.

Light signals $S_1$–$S_4$ are emitted respectively by the light emitting elements 20a–20d formed in a one-dimensional array. The plurality of the light signals $S_1$–$S_4$ emitted by the light emitting elements 20a–20d enter the transparent body 10 at the first end face 12.

The plurality of the light signals $S_1$–$S_4$ which have entered the transparent body 10 are reflected respectively on the plurality of the light reflecting parts 16a–16d. The light signals $S_1$–$S_4$ respectively reflected on the light reflecting parts 16a–16d exit the transparent body 10 outside at the second end face 14.

The light signals $S_1$–$S_4$ which has exited at the second end face 14 enter the optical waveguides 21a–21d arranged in the one dimensional array.

The pitch of the light reflecting parts 16a–16d formed on the third end face 15, which are projected on the first end face 12 is the first pitch $\Delta P_X$, and the pitch of the light reflecting portions 16a–16d formed on the third end face 15, which are projected on the second end face 14 is the second pitch $\Delta P_Y$, whereby the light signals $S_1$–$S_4$ emitted by the light emitting elements 20a–20d arranged at the first pitch $\Delta P_X$ can enter the optical waveguides 21a–21d arranged at the second pitch $\Delta P_Y$.

As described above, the optical transmission unit 42 according to the present embodiment can function as an optical transmission unit.

The light emitting element array 20 is mounted on the circuit board 36 here, but the light receiving element array 23 (see FIG. 6) may be mounted on the circuit board 36. In this case, the optical transmission unit which can function as a light receiving unit can be provided.

As described above, the optical transmission unit 42 may comprise the optical element 18 according to the present embodiment.

(The Optical Transmission System)

Figure 11:
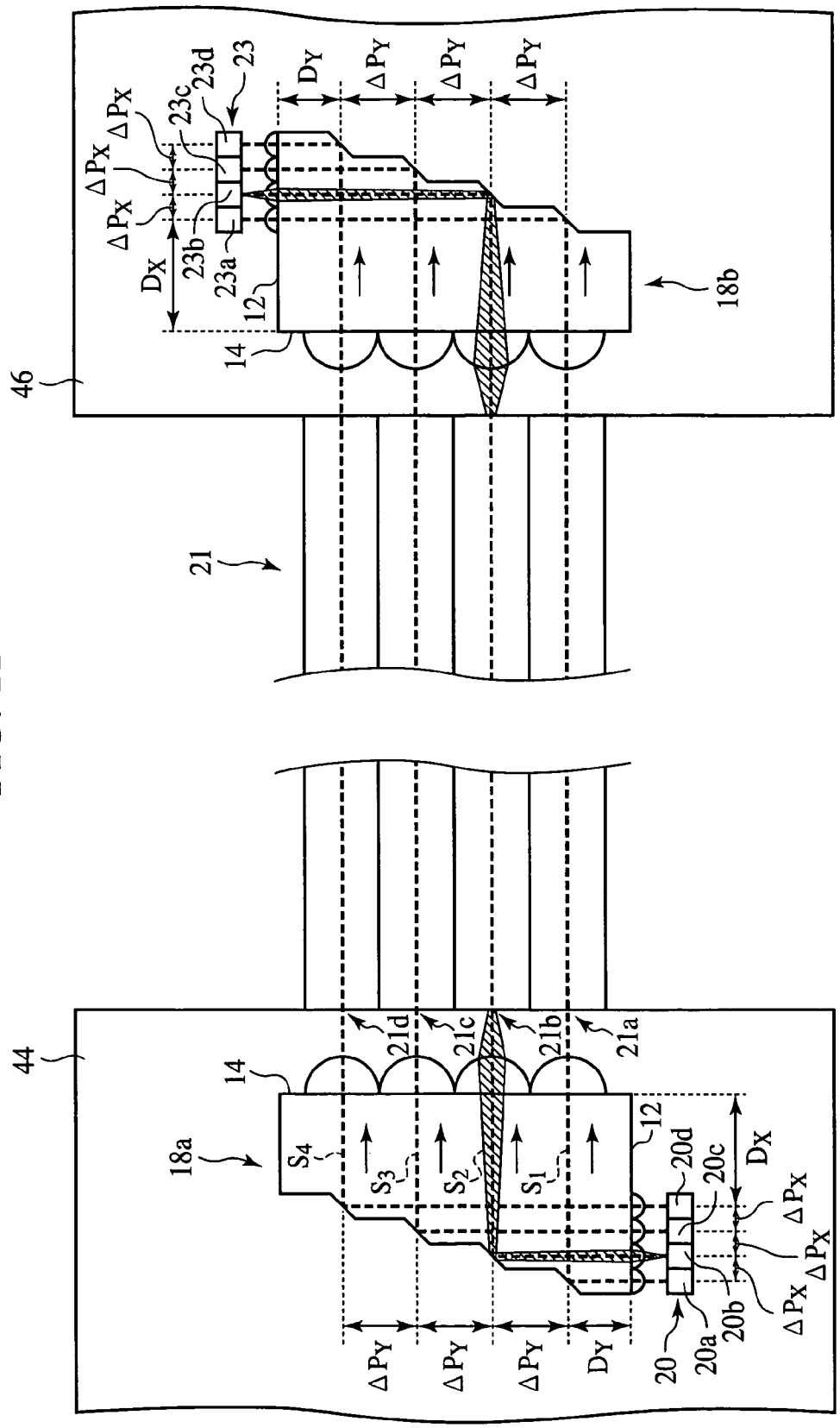
FIG. 11 is a conceptual view illustrating the optical transmission system according to the embodiment of the present invention.

Next, the optical transmission system comprising the optical element according to the present embodiment will be explained with reference to FIG. 11. FIG. 11 is a diagrammatic view illustrating the optical transmission system according to the present embodiment.

As illustrated in FIG. 11, an optical waveguide array 21 for transmitting light signals is disposed between a transmission unit 44 for transmitting light signals and a light receiving unit for receiving the light signals. Optical elements 18a, 18b are disposed respectively on both sides of the optical waveguide array 21. The optical elements 18a, 18b can be any one of the optical elements 18 described above with reference to FIGS. 1 to 9. The pitch of the optical waveguides 21a–21d arranged in an array is, e.g., 500 µm as described above. One end of the optical waveguide array 21 is opposed to the second end face 14 of the optical element 18a. The other end of the optical waveguide 21 is opposed to the second end face 14 of the optical element 18b.

The light emitting array 20 is disposed on the side of the first end face 12 of the optical element 18a. As in the above, the light emitting element array 20 comprises the light emitting elements 20a–20d arranged at the first pitch $\Delta P_X$ in a one dimensional array.

E.g., the light receiving array 23 is disposed on the side of the first end face 12 of the optical element 18b. The light receiving array 23 can be, e.g., the PD array. The light receiving element array 23 comprises the light receiving elements 23a–23d arranged at the first pitch $\Delta P_X$ in a one dimensional array.

As illustrated in FIG. 11, the optical element 18a and the optical element 18b are arranged so that a light signal $S_1$ reflected on the light reflecting part 16a formed on the third end face 15 of the optical element 18a passes through the optical waveguide 21a and is reflected on the light reflecting part 16d formed on the third end face 15 of the optical element 18b; a light signal $S_2$ reflected on the light reflecting part 16b formed on the third end face 15 of the optical element 18a passes through the optical waveguide 21b and is reflected on the light reflecting part 16c formed on the third end face 15 of the optical element 18b; a light signal $S_3$ reflected on the light reflecting part 16c formed on the third end face 15 of the optical element 18a passes through the optical waveguide 21c and is reflected on the light reflecting part 16b formed on the third end face 15 of the optical element 18b; and a light signal $S_4$ reflected on the light reflecting part 16d formed on the third end face 15 of the optical element 18a passes through the optical waveguide 21d and is reflected on the light reflecting part 16a formed on the third end face 15 of the optical element 18b.

That is, the first optical element 18a and the second optical element 18b are arranged so that a light signal $S_1$ reflected on the light reflecting part 16a of the plurality of light reflecting parts 16a–16d formed on the third end face 15 of the first optical element 18a, which is nearest to the first end face 12 is reflected on the light reflecting part 16d of the plurality of light reflecting parts 16a–16d formed on the third end face 15 of the second optical element 18b, which is most remote from the first end face 12; and a light signal $S_4$ reflected on the light reflecting part 16d of the plurality of light reflecting parts 16a–16d formed on the third end face 15 of the first optical element 18a, which is most remote from the first end face 12 is reflected the light reflection part 16a of the plurality of light reflecting parts 16a–16d formed on the third end face 15 of the second optical element 18b, which is nearest to the first end face 12.

The optical elements 18a and the optical element 18b are thus arranged so that, as will be described later, the transmission distances of the plurality of light signals $S_1$–$S_4$ are set equal to each other.

Next, the operation of the optical transmission system according to the present embodiment will be explained.

Light signals $S_1$–$S_4$ exiting the light emitting elements 20a–20d enter the optical element 18a at the first end face 12 of the optical element 18a, are reflected respectively on the light reflecting parts 16a–16d of the optical element 18a and exit at the second end face 14 of the optical element 18a. Light signals $S_1$–$S_4$ exiting the optical element 18a pass respectively through the optical waveguides 21a–21d and enter the optical element 18b at the second end face 14 of the optical element 18b. The light signals $S_1$–$S_4$ which have entered the optical element 18b are reflected respectively on the light reflection parts 16a–16d of the optical element 18b and exit at the first end face 12 of the optical element 18b. The light signals $S_1$–$S_4$ exiting at the first end face 12 of the optical element 18b respectively enter the light receiving elements 23a–23d. The light receiving elements 23a–23d respectively detect the light signals $S_1$–$S_4$.

As illustrated in FIG. 11, the transmission distance in the optical element 18a of the light signal $S_1$ exiting the light emitting element 20a is $D_X+3\cdot\Delta P_X+D_Y$. The transmission distance in the optical element 18b of the light signal $S_1$ is $D_X+3\cdot\Delta P_Y+D_Y$. The transmission distance of the light signal $S_1$ in the optical element 18a and the optical element 18b is totally $2\cdot D_X+3\cdot\Delta P_X+3\cdot\Delta P_Y+2\cdot D_Y$.

The transmission distance in the optical element 18a of the light signal $S_2$ exiting the light emitting element 20b is $D_X+2\cdot\Delta P_X+\Delta P_Y+D_Y$. The transmission distance in the optical element 18b of the light signal $S_2$ is $D_X+\Delta P_X+2\cdot\Delta P_Y+D_Y$. The transmission distance of the light signal $S_2$ in the optical element 18a and the optical element 18b is totally $2\cdot D_X+3\cdot\Delta P_X+3\cdot\Delta P_Y+2\cdot D_Y$.

The transmission distance in the optical element 18a of the light signal $S_3$ exiting the light emitting element 20c is $D_X+\Delta P_X+2\cdot\Delta P_Y+D_Y$. The transmission distance in the optical element 18b of the light signal $S_3$ is $D_X+2\cdot\Delta P_X+\Delta P_Y+D_Y$. The transmission distance of the light signal $S_3$ in the optical element 18a and the optical element 18b is totally $2\cdot D_X+3\cdot\Delta P_X+3\cdot\Delta P_Y+2\cdot D_Y$.

The transmission distance in the optical element 18a of the light signal $S_4$ exiting the light emitting element 20d is $D_X+3\cdot\Delta P_Y+D_Y$. The transmission distance in the optical element 18b of the light signal $S_4$ is $D_X+3\cdot\Delta P_X+D_Y$. The transmission distance of the light signal $S_4$ in the optical element 18a and the optical element 18b is totally $2\cdot D_X+3\cdot\Delta P_X+3\cdot\Delta P_Y+2\cdot D_Y$.

As described above, in the optical transmission system according to the present embodiment, the optical element 18a and the optical element 18b are arranged as described above, whereby the transmission distances of a plurality of light signals $S_1$–$S_4$ can be made equal to each other. Thus, according to the present embodiment, the optical transmission system of high reliability can be constituted.

MODIFIED EMBODIMENTS

The present invention is not limited to the above-described embodiments and can cover other various modifications.

For example, in the above-described embodiment, the pitch of the light reflecting parts 16a–16d formed on the third end face 15 projected on the first end face 12 is 250 μm, the pitch of the light reflecting parts 16a–16d 16d formed on the third end face 15 projected on the second end face 14 is 500 μm. However, the pitch of the light reflecting parts 16a–16d is not limited to them and may be suitably set so as to match the pitches of the light emitting elements 20a–20d, the light receiving elements 23a–23d, the optical waveguides 21a–21d, etc.

In the above-described embodiment, the light emitting elements 20a–20d are VCSELs. However, the light emitting elements 20a–20d are not limited to VCSELs and can be suitably any light emitting elements.

In the above-described embodiment, the light receiving elements 23a–23d are PDs. However, the light receiving elements 23a–23d are not limited to PDs and can be suitably any light receiving elements.

In the above-described embodiment, the optical waveguides 21a–21d are plastic optical fibers. However, the optical waveguides 21a–21d are not limited to plastic optical fibers and can be suitably optical waveguides of any material.

In the above-described embodiment, the light emitting elements or the light receiving elements formed at the first pitch $\Delta P_X$ in an array is formed on the first end face 12 of the optical elements 18, 18a, 18b. However, optical waveguides formed at the first pitch $\Delta P_X$ arranged in an array may be disposed on the first end face 12 of the optical elements 18, 18a, 18b. In this case, optical waveguide arrays having different pitches from each other can be optically connected by using the optical elements 18, 18a, 18b.

In the above-described embodiment, the light emitting element array 20, etc. and the optical waveguide array 21 are optically connected by using the optical elements 18, 18a, 18b. However, the present invention is applicable to cases that optical member arrays having different pitches from each other are optically connected with each other.

In the above-described embodiment, the intersection angle between the first end face 12 and the second end face 14 is 90 degrees. However, the intersection angle between the first end face 12 and the second end face 14 is not essentially 90 degrees. For example, the intersection angle may be suitably set so that light signals $S_1$–$S_4$ exiting the optical elements, etc. arranged at the first pitch $\Delta P_X$ enter the optical waveguides, etc. connected at the second pitch $\Delta P_Y$.

In the above-described embodiment, the light reflecting parts 16a–16d are tilted to the first end face 12 by 45 degrees and tilted to the second end face 14 by 45 degrees. However, the tilt of the light reflecting parts 16a–16d to the first end face 12 or the second end face 14 is not essentially 45 degrees. For example, the tilt of the light reflection parts 16a–16d may be suitably set so that light signals $S_1$–$S_4$ emitted by the light emitting elements, etc. arrange at the first pitch $\Delta P_X$ can enter the optical waveguides, etc. arranged at the second pitch $\Delta P_Y$.

In the above-described embodiment, four light emitting elements 20a–20d, four optical waveguides 21a–21d, four light reflecting parts 16a–16d, etc. are disposed. However, the numbers of the light emitting elements, the optical waveguides, the light reflecting parts, etc. are not limited to four and can be suitably set.

INDUSTRIAL APPLICABILITY

The optical element, the optical transmission unit and the optical transmission system according to the present invention are useful to easily connect optically optical element arrays, optical waveguide arrays, etc. having pitches different from one another.

The invention claimed is:

1. An optical element comprising a transparent body including a first end face; a second end face forming a prescribed angle to the first end face; and a third end face having a plurality of light reflection parts formed on, which respectively reflect a plurality of light signals entering one of the first end face and the second end face to cause to exit at the other of the first end face and the second end face,
   a pitch of the plurality of light reflecting parts formed on the third end face, which are projected on the first end face being a first pitch, and
   a pitch of the plurality of light reflecting parts formed on the third end face, which are projected on the second end face being a second pitch which is different from the first pitch,
   wherein the plurality of light reflection parts formed on the third end face are tilted respectively by the same angle to the first end face.

2. An optical element according to claim 1, wherein the intersection angle between the first end face and the second end face is substantially 90 degrees, and
   the plurality of light reflecting parts formed on the third end face are tilted respectively by about 45 degrees to the first end face or the second end face.

3. An optical element according to claim 1, wherein a plurality of lenses are formed on the first end face at the first pitch.

4. An optical element according to claim 1, wherein a plurality of lenses are formed on the second end face at the second pitch.

5. An optical element according to claim 3, wherein the lenses are formed integral with the transparent body.

6. An optical element according to claim 4, wherein the lenses are formed integral with the transparent body.

7. An optical element according to claim 3, wherein the lens is formed so that a beam waist of the light signal is positioned in a vicinity of the light reflecting part.

8. An optical element according to claim 4, wherein the lens is formed so that a beam waist of the light signal is positioned in a vicinity of the light reflecting part.

9. An optical element according to claim 1, wherein a light absorber which absorbs light is formed on the face of the third end face except the light reflecting part.

10. An optical element according to claim 1, wherein a light reflecting film which reflects the light signals is formed on the light reflecting parts formed on the third end face.

11. An optical transmission unit comprising:
a circuit board;
a plurality of light emitting elements disposed on the circuit board and arranged at a first pitch, for respectively emitting light signals; and
an optical element disposed on the circuit board and comprising a transparent body including a first end face opposed to the plurality of light emitting elements, a second end face forming a prescribed angle to the first end face, and a third end face having a plurality of light reflecting parts which respectively reflect the plurality of light signals entering at the first end face and causing the plurality of light signals to exit at the second end face, a pitch of the plurality of light reflecting parts formed on the third end face, which are projected on the first end face being the first pitch, and a pitch of the plurality of light reflection parts formed on the third end face, which are projected on the second end face being a second pitch which is different from the first pitch,
   wherein the plurality of light reflection parts formed on the third end face are tilted respectively by the same angle to the first end face.

12. An optical transmission unit comprising:
a circuit board;
an optical element disposed on the circuit board and including a transparent body including a first end face, a second end face forming a prescribed angle to the first end face, and a third end face having a plurality of light reflecting parts which respectively reflect a plurality of light signals entering at the second end face to cause the light signals to exit at the first end face, a pitch of the plurality of light reflecting parts formed on the third end face, which are projected on the first end face being a first pitch, and a pitch of the plurality of light reflecting parts formed on the third end face, which are projected on the second end face being a second pitch which is different form the first pitch; and
a plurality of light receiving elements arranged at the first pitch, opposed to the first end face of the optical element, which respectively receive the plurality of light signals,
   wherein the plurality of light reflection parts formed on the third end face are tilted respectively by the same angle to the first end face.

13. An optical transmission unit according to claim 11, further comprising
   a plurality of optical waveguides arranged at the second pitch, opposed to the second end face of the optical element.

14. An optical transmission unit according to claim 12, further comprising
   a plurality of optical waveguides arranged at the second pitch, opposed to the second end face of the optical element.

15. An optical transmission system comprising:
a plurality of light emitting elements arranged at a first pitch, for respectively emitting light signals;
a first optical element including a transparent body having a first end face opposed to the plurality of light emitting elements, a second end face forming a prescribed angle to the first end face, and a third end face having a plurality of light reflecting parts which respectively reflect the plurality of light signals entering at the first end face to cause the plurality of light signals to exit at the second end face, a pitch of the plurality of light reflecting parts formed on the third end face, which are projected on the first end face being the first pitch, a pitch of the plurality of light reflecting parts formed on the third end face, which are projected on the second end face being a second pitch which is different from the first pitch;
a plurality of optical waveguides arranged at the second pitch and having one ends opposed to the second end face of the first optical element; and a second optical element including a fourth end face opposed to the other ends of the plurality of optical waveguides, a fifth end face forming a prescribed angle to the fourth end face, and a sixth end face having a plurality of light reflecting parts formed on, which respectively reflect a plurality of light signals entering at the fourth end face to cause the plurality of light signals to exit at the fifth end face, a pitch of the plurality of light reflecting parts formed on the sixth end face, which are projected on the fifth end face being the first pitch, and a pitch of the plurality of light reflecting parts formed on the sixth end face, which are projected on the fourth end face being the second pitch; and a plurality of light receiving elements arranged at the first pitch, opposed to the fifth end face of the second optical element, for respectively receiving the plurality of light signals.

16. An optical transmission system according to claim 15, wherein the first optical element and the second optical element are arranged so that the light signal reflected on the light reflecting part of the plurality of light reflecting parts formed on the third end face, which is nearest to the first end face is reflected on the other light reflecting part of the plurality of other reflecting parts formed on the sixth end face, which is remotest from the fourth end face, and the light signal reflected on the light reflecting part of the plurality of light reflecting parts formed on the third end face, which is remotest from the first end face is reflected on the other light reflecting part of the plurality of other reflecting parts formed on the sixth end face, which is nearest to the fourth end face.

* * * * *